(12) United States Patent
Jin

(10) Patent No.: US 10,748,478 B2
(45) Date of Patent: Aug. 18, 2020

(54) OLED PANEL TEMPERATURE COMPENSATION SYSTEM AND OLED PANEL TEMPERATURE COMPENSATION METHOD

(71) Applicant: Shenzhen China Star Optoelectronics Semiconductor Display Technology Co., Ltd., Shenzhen (CN)

(72) Inventor: Yufeng Jin, Shenzhen (CN)

(73) Assignee: SHENZHEN CHINA STAR OPTOELECTRONICS SEMICONDUCTOR DISPLAY TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/300,051

(22) PCT Filed: Sep. 20, 2018

(86) PCT No.: PCT/CN2018/106613
§ 371 (c)(1),
(2) Date: Nov. 8, 2018

(87) PCT Pub. No.: WO2019/237553
PCT Pub. Date: Dec. 19, 2019

(65) Prior Publication Data
US 2019/0378454 A1 Dec. 12, 2019

(30) Foreign Application Priority Data
Jun. 11, 2018 (CN) .......................... 2018 1 0619412

(51) Int. Cl.
*G09G 3/3225* (2016.01)
*G01K 1/02* (2006.01)

(52) U.S. Cl.
CPC .......... *G09G 3/3225* (2013.01); *G01K 1/026* (2013.01); *G09G 2320/041* (2013.01); *G09G 2330/12* (2013.01)

(58) Field of Classification Search
CPC ............. G09G 3/3225; G09G 2330/12; G09G 2320/041; G01K 1/026
See application file for complete search history.

(56) References Cited

U.S. PATENT DOCUMENTS

| 2012/0139955 A1* | 6/2012 | Jaffari | .................. | G09G 3/3258 345/690 |
| 2014/0139570 A1* | 5/2014 | Albrecht | .................. | G09G 5/06 345/694 |

(Continued)

FOREIGN PATENT DOCUMENTS

| CN | 104350536 A | 2/2015 |
| CN | 105679265 A | 6/2016 |

(Continued)

*Primary Examiner* — Ryan A Lubit
(74) *Attorney, Agent, or Firm* — Leong C. Lei

(57) ABSTRACT

The invention provides an OLED panel temperature compensation system and method. The system comprises an OLED panel and a processing module connected to the OLED panel, the OLED panel is disposed with a temperature sensor layer of a plurality of temperature sensors on one side or inside; when performing temperature compensation, the temperature sensor detects the temperature of the location and transmits to the processing module, the processing module receives and processes the initial data signals of the plurality of sub-pixels to obtain the to-be-displayed brightness of the plurality of sub-pixels, and receives and processes the temperatures from the plurality of temperature sensors to obtain the temperatures of the plurality of sub-pixels, and generates and outputs compensation data signals corresponding to the plurality of sub-pixels according to the to-be-displayed brightness and temperature of the plurality (Continued)

of sub-pixels. The OLED panel is thus accurately and effectively compensated for temperature.

5 Claims, 5 Drawing Sheets

(56) References Cited

U.S. PATENT DOCUMENTS

2017/0092180 A1* 3/2017 Cote .................... G09G 3/3225
2017/0221430 A1 8/2017 Tari

FOREIGN PATENT DOCUMENTS

| CN | 107274836 A | 10/2017 |
| CN | 107731160 A | 2/2018 |

* cited by examiner

OLED PANEL TEMPERATURE COMPENSATION SYSTEM AND OLED PANEL TEMPERATURE COMPENSATION METHOD

BACKGROUND OF THE INVENTION

1. Field of the Invention

The present invention relates to the field of display, and in particular to an organic light-emitting diode (OLED) panel temperature compensation system and OLED panel temperature compensation method.

2. The Related Arts

The organic light-emitting diode (OLED) display device provides the advantages of self-luminous, low driving voltage, high luminous efficiency, short response time, high definition and contrast, near 180° viewing angle, wide temperature range, and the ability to realize flexibility display and large-area full-color display, and is recognized by the industry as the most promising display device.

According to the driving method, the OLED display device can be divided into two types: passive matrix OLED (PMOLED) and active matrix OLED (AMOLED), namely, direct addressing and thin film transistor (TFT) matrix addressing categories, wherein the AMOLED has the pixels arranged in an array, belongs to an active display type, has high light emission efficiency, and is generally used for a high-definition large-sized display device.

The AMOLED is a current-driven device. When a current flows through the OLED, the OLED emits light and the luminance is determined by the current flowing through the OLED. Most existing integrated circuits (ICs) only transmit voltage signals, so the pixel driving circuit of the AMOLED needs to accomplish the task of converting the voltage signal into a current signal. The conventional AMOLED pixel driving circuit usually uses a 2T1C structure, that is, a structure with two TFTs and a capacitor to converts the voltage into a current.

The known OLED panels, due to the light emission properties, cause localized heat generation, and temperature has a great impact on the material of the OLED. Therefore, it is necessary to detect the panel temperature of the OLED and adjust the data signal inputted to the sub-pixels of the OLED panel according to the temperature to achieve temperature compensation. At present, a common temperature-compensated OLED display is generally provided with a temperature sensor on a printed circuit board (PCB) bonded by a chip on film (COF) and an OLED panel, and the temperature sensor is used for temperature detection. Then, the temperature compensation is performed on the OLED panel. The temperature detected by the temperature sensor of the OLED display is the full range temperature, and the temperature detection is not precise. As the temperature difference is different in each region of the OLED panel due to heat dissipation and characteristics, the temperature difference is large and the temperature obtained by placing the temperature sensor on the PCB does not effectively compensate the temperature of the OLED panel.

SUMMARY OF THE INVENTION

The object of the present invention is to provide an OLED panel temperature compensation system, able to accurately and effectively perform temperature compensation on the OLED panel.

Another object of the present invention is to provide an OLED panel temperature compensation method, able to accurately and effectively perform temperature compensation on the OLED panel.

To achieve the above object, the present invention provides an OLED panel temperature compensation system, which comprises: an OLED panel and a processing module electrically connected to the OLED panel;

the OLED panel comprising a plurality of sub-pixels arranged in an array, one side of the OLED panel being disposed with a temperature sensor layer; or inside of the OLED panel being disposed with a temperature sensor layer parallel to the side of the OLED panel;

the temperature sensor layer comprising a plurality of temperature sensors disposed at intervals; each temperature sensor being electrically connected to the processing module;

the temperature sensor being configured to detect a temperature of a location located therein and transmitting the temperature to the processing module;

the processing module being configured to receive an initial data signal of a plurality of sub-pixels and process to obtain a to-be-displayed brightness of the plurality of sub-pixels; the processing module receiving the temperatures from the plurality of temperature sensors and processes the temperatures to obtain the temperatures of the plurality of sub-pixels, and the processing module generating and outputting the compensation data signals corresponding to the plurality of sub-pixels according to the to-be-displayed brightness of the plurality of sub-pixels and the temperatures of the plurality of sub-pixels.

In a preferred embodiment, the specific manner for the processing module to receive the temperatures at the location of the plurality of temperature sensors and processes to obtain the temperatures at the location where the plurality of sub-pixels are located is: setting one of the plurality of sub-pixels as a to-be-tested sub-pixel; the processing module receiving the temperatures at the locations of four temperature sensors adjacent to the to-be-tested sub-pixel, and calculating the temperature of the to-be-tested sub-pixel by bilinear interpolation.

In a preferred embodiment, the temperature sensor layer comprises a plurality of temperature sensors arranged in an array.

In a preferred embodiment, among the four temperature sensors in the 2×2 array adjacent to the to-be-tested sub-pixel, the temperature sensor at the first row first column, the temperature sensor at the first row second column, the temperature sensor at the second row first column, and the temperature sensor at the second row second column are defined as a first temperature sensor, a second temperature sensor, a third temperature sensor, and a fourth temperature sensor, respectively; the processing module obtains the temperatures of the first temperature sensor, the second temperature sensor, the third temperature sensor, and the fourth temperature sensor, and calculates the temperature of the to-be-tested sub-pixel according to a bilinear interpolation calculation formula;

the bilinear interpolation calculation formula is as follows:

$$T=[Y2*(T1*X2+T2*X1)+Y1*(T3*X2+T4*X1)]/[(X1+X2)*(Y1+Y2)];$$

wherein T is the temperature of the to-be-tested sub-pixel, T1 is the temperature at the location of the first temperature sensor, T2 is the temperature at the location of the second temperature sensor, and T3 is the temperature at the location of the third temperature sense, T4 is the temperature at the location of the fourth temperature sensor; X1 is a horizontal distance between center of the to-be-tested sub-pixel and center of the first temperature sensor and the third temperature sensor, X2 is a horizontal distance between center of the to-be-tested sub-pixel and center of the second temperature sensor and the fourth temperature sensor, Y1 is a vertical distance between center of the to-be-tested sub-pixel and center of the first temperature sensor and the second temperature sensor, and Y2 is a vertical distance between center of the to-be-tested sub-pixel and center of the third temperature sensor and the fourth temperature sensor.

In a preferred embodiment, the temperature sensor layer comprises a plurality of rows of temperature sensors, and any adjacent four temperature sensors form a virtual parallelogram.

In a preferred embodiment, the four temperature sensors adjacent to the to-be-tested sub-pixel are defined as a first temperature sensor, a second temperature sensor, a third temperature sensor, and a fourth temperature sensor, respectively; a line connecting center of the first temperature sensor and center of the second temperature sensor is parallel to a line connecting center of the third temperature sensor and center of the fourth temperature sensor; a line connecting the center of the first temperature sensor and the center of the third temperature sensor is parallel to a line connecting the center of the second temperature sensor and the center of the fourth temperature sensor; the processing module obtains the temperatures of the first temperature sensor, the second temperature sensor, the third temperature sensor, and the fourth temperature sensor, and calculates the temperature of the to-be-tested sub-pixel according to a bilinear interpolation calculation formula;

the bilinear interpolation calculation formula is as follows:

$$T' = [Y2'*(T1'*X2'+T2'*X1')+Y1'*(T3'*X2'+T4'*X1')] / [(X1'+X2')*(Y1'+Y2')];$$

wherein T' is the temperature of the to-be-tested sub-pixel, T1' is the temperature at the location of the first temperature sensor, T2' is the temperature at the location of the second temperature sensor, and T3' is the temperature at the location of the third temperature sense, T4' is the temperature at the location of the fourth temperature sensor; X1' is a distance between the line connecting the center of the first temperature sensor and the center of the third temperature sensor and center of the to-be-tested sub-pixel in a direction parallel to the line connecting the center of the first temperature sensor and the center of the second temperature center, X2' is a distance between the line connecting the center of the second temperature sensor and the center of the fourth temperature sensor and the center of the to-be-tested sub-pixel in a direction parallel to the line connecting the center of the first temperature sensor and the center of the second temperature center, Y1' is a distance between the line connecting the center of the first temperature sensor and the center of the second temperature sensor and center of the to-be-tested sub-pixel in a direction parallel to the line connecting the center of the first temperature sensor and the center of the third temperature center, and Y2' is a distance between the line connecting the center of the third temperature sensor and the center of the fourth temperature sensor and center of the to-be-tested sub-pixel in a direction parallel to the line connecting the center of the first temperature sensor and the center of the third temperature center.

In a preferred embodiment, the distance between adjacent temperature sensors is 3 cm-5 cm.

In a preferred embodiment, the specific manner for the processing module to generate a compensation data signal corresponding to the plurality of sub-pixels according to the to-be-displayed brightness of the plurality of sub-pixels and the temperatures of the plurality of sub-pixels is: according to the to-be-displayed brightness of the plurality of sub-pixels, the temperatures of the plurality of sub-pixels, and the default reference data table of relation among the voltage difference between the compensation data voltages corresponding respectively to the plurality of sub-pixels and the threshold voltage of the of driving thin film transistor (TFT), temperature and display brightness, the processing module obtains the voltage difference between the compensation data voltages of corresponding plurality of sub-pixels and the threshold voltage of the driving TFT, and calculate a sum of the voltage difference between the compensation data voltages and threshold voltage and the default threshold voltages of the driving TFT of the plurality of sub-pixels respectively to obtain the compensation data voltages of the plurality of sub-pixels; according to the compensation data voltages of the plurality of sub-pixels, the processing module generates the corresponding compensation data signals of the plurality of sub-pixels.

In a preferred embodiment, the reference data table corresponding to each sub-pixel comprises a plurality of sequentially increasing voltage difference node values between the compensation data voltages and the driving TFT threshold voltage, a plurality of sequentially increasing temperature node values, and a plurality of display brightness node values; one display brightness node value corresponds to a combination of one voltage difference node value between the compensation data voltage and the driving TFT threshold voltage and one temperature node value; when the temperature of the sub-pixel and a corresponding temperature node value in the reference data table are equal, the to-be-displayed brightness of the sub-pixel is equal to a display brightness node value in the corresponding reference data table; and when a combination of the temperature of the sub-pixel and a voltage difference node value between the compensation data voltage and the driving TFT threshold voltage in the corresponding reference data voltage corresponds to the to-be-displayed brightness of the sub-pixel, the voltage difference node value between the compensation data voltage of the to-be-displayed brightness of the sub-pixel and the driving TFT threshold voltage corresponding to the combination with the temperature of the sub-pixel is used as the voltage difference between the compensation data voltage of the sub-pixel and the driving TFT threshold voltage; otherwise, the processing modules uses the reference data table, the to-be-displayed brightness of the sub-pixel, the temperature of the sub-pixel to obtain the voltage difference between the compensation data voltage of the sub-pixel and the driving TFT threshold voltage by interpolation.

The present invention also provides an OLED panel temperature compensation method, applicable to the above OLED panel temperature compensation system, which comprises the steps of:

Step S1: the temperature sensors sensing temperatures at locations where the temperature sensors being located therein, and transmitting to the processing module;

Step S2: the processing module receiving and processing the initial data signals of the plurality of sub-pixels to obtain the to-be-displayed brightness of the plurality of sub-pixels, and the processing module receiving and processing the temperatures from the plurality of temperature sensors to obtain the temperatures of the plurality of sub-pixels, the processing module generating and outputting compensation data signals corresponding to the plurality of sub-pixels according to the to-be-displayed brightness of the plurality of sub-pixels and the temperature of the plurality of sub-pixels.

The present invention provides the following advantages: the OLED panel temperature compensation system comprises an OLED panel and a processing module electrically connected to the OLED panel, the OLED panel comprises a plurality of sub-pixels arranged in an array, and is disposed with a temperature sensor layer of a plurality of temperature sensors on one side or inside; when temperature compensation is performed on the OLED panel, the temperature sensor detects the temperature of the location and transmits to the processing module, and the processing module receives and processes the initial data signals of the plurality of sub-pixels to obtain the to-be-displayed brightness of the plurality of sub-pixels, and receives and processes the temperatures from the plurality of temperature sensors to obtain the temperatures of the plurality of sub-pixels, and generates and outputs compensation data signals corresponding to the plurality of sub-pixels according to the to-be-displayed brightness of the plurality of sub-pixels and the temperature of the plurality of sub-pixels. As such, the OLED panel can be accurately and effectively compensated for temperature. The invention provides an OLED panel temperature compensation method, which can accurately and effectively compensate the temperature of the OLED panel.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technical means and effect of the present invention, the following refers to embodiments and drawings for detailed description.

Figure 1:
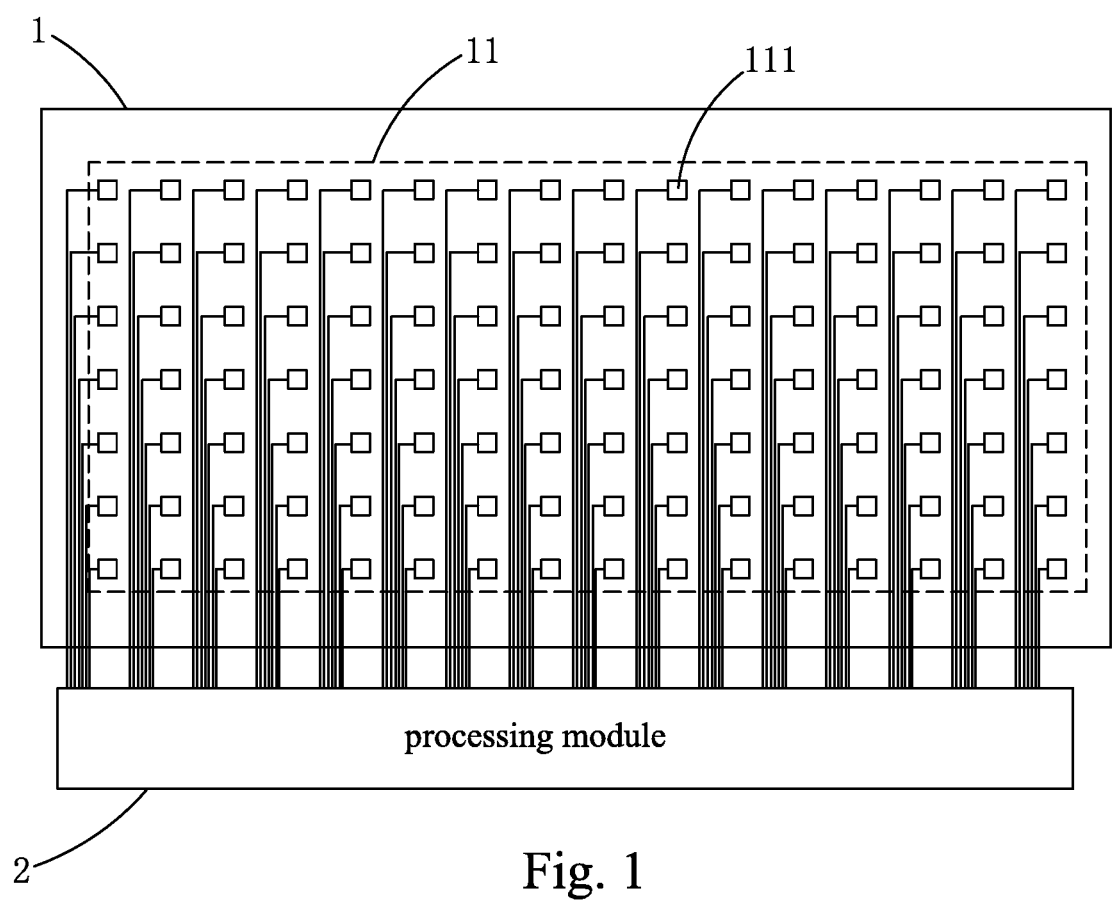
FIG. 1 is a schematic view showing the structure of the OLED panel temperature compensation system of the first embodiment of the present invention.

Refer to FIG. 1. The OLED panel temperature compensation system of the first embodiment of the present invention comprises: an OLED panel 1 and a processing module electrically connected to the OLED panel 1.

The OLED panel 1 comprises a plurality of sub-pixels arranged in an array. One side of the OLED panel 1 is disposed with a temperature sensor layer 11. The temperature sensor layer 11 comprises a plurality of temperature sensors 111 disposed at intervals. Each temperature sensor 111 is electrically connected to the processing module 2.

The temperature sensor 111 is configured to detect the temperature at the location where the temperature sensor 111 is located and transmit to the processing module 2.

The processing module 2 is configured to receive an initial data signal of a plurality of sub-pixels and process to obtain a to-be-displayed brightness of the plurality of sub-pixels; the processing module 2 receives the temperatures from the plurality of temperature sensors and processes the temperatures to obtain the temperatures of the plurality of sub-pixels, and the processing module 2 generates and outputs the compensation data signals corresponding to the plurality of sub-pixels according to the to-be-displayed brightness of the plurality of sub-pixels and the temperatures of the plurality of sub-pixels.

Preferably, in the first embodiment of the present invention, the temperature sensor layer 11 is disposed on the back surface of the OLED panel 1, that is, the non-light-emitting surface of the OLED panel 1. The temperature sensor layer 11 can be made of a transparent material or an opaque material.

Specifically, in the other embodiments of the present invention, the temperature sensor layer 11 may also be disposed inside the OLED panel 1 and kept parallel to the side surface of the OLED panel 1. The known OLED panel generally comprises a substrate, a thin film transistor (TFT) array layer and an OLED device layer disposed in sequence. When the temperature sensor layer 11 is made of a transparent material, the temperature sensor layer 11 may be disposed in the OLED panel 1 on a side of the OLED device layer away from the substrate; when the temperature sensor layer 11 is made of an opaque material, the temperature sensor layer 11 may also be disposed on the substrate in the same layer as the TFT array layer.

Specifically, the processing module 2 can be a timing controller (TCON). The OLED panel temperature compensation system further comprises an X board (not shown) bonded to the OLED panel 1 by chip on film (COF) and a C board (not shown) bonded to the X board, and the timing controller is disposed on the C board. The plurality of temperature sensors 111 are electrically connected to the X board through the COF, and are electrically connected to the timing controller on the C board bonded to the X board.

Specifically, refer to FIG. 1. In the first embodiment of the present invention, the temperature sensor layer 11 comprises a plurality of temperature sensors 111 arranged in an array. The specific manner for the processing module 2 to receive the temperatures at the location of the plurality of temperature sensors 111 and processes to obtain the temperatures at the location where the plurality of sub-pixels are located is: setting one of the plurality of sub-pixels as a to-be-tested sub-pixel; the processing module 2 receives the temperatures at the locations of four temperature sensors 111 adjacent to the to-be-tested sub-pixel, and calculates the temperature of the to-be-tested sub-pixel by bilinear interpolation.

Figure 2:
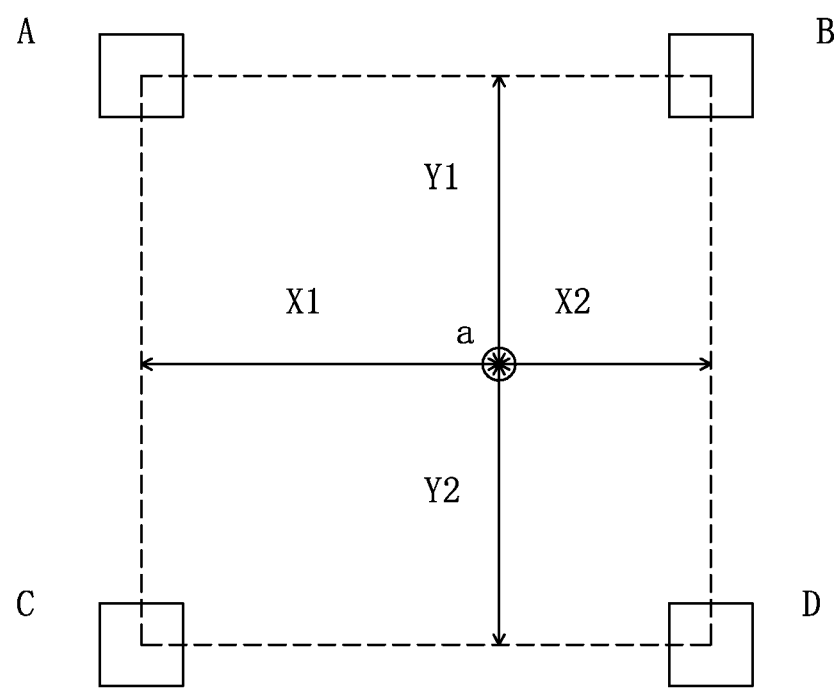
FIG. 2 is a schematic view showing obtaining the temperature of the to-be-tested sub-pixel of the OLED panel temperature compensation system of the first embodiment of the present invention.

Moreover, refer to FIG. 2. Among the four temperature sensors 111 in the 2×2 array adjacent to the to-be-tested sub-pixel a, the temperature sensor 111 at the first row first column, the temperature sensor 111 at the first row second column, the temperature sensor 111 at the second row first column, and the temperature sensor 111 at the second row second column are defined as a first temperature sensor A, a second temperature sensor B, a third temperature sensor C, and a fourth temperature sensor D, respectively. Because the center of each of the first temperature sensor A, the second temperature sensor B, the third temperature sensor C, and the fourth temperature sensor D and the coordinates of the center of the to-be-tested sub-pixel a on the OLED panel 1 are all known values, the horizontal distance X1 between center of the to-be-tested sub-pixel a and center of the first temperature sensor A and the third temperature sensor C, the horizontal distance X2 between center of the to-be-tested sub-pixel a and center of the second temperature sensor B and the fourth temperature sensor D, the vertical distance Y1 between center of the to-be-tested sub-pixel a and center of the first temperature sensor A and the second temperature sensor B, and the vertical distance Y2 between center of the to-be-tested sub-pixel a and center of the third temperature sensor C and the fourth temperature sensor D are all known values, too. The processing module 2 obtains the temperatures of the first temperature sensor A, the second temperature sensor B, the third temperature sensor C, and the fourth temperature sensor D, and calculates the temperature of the to-be-tested sub-pixel a according to a bilinear interpolation calculation formula.

In the first embodiment of the present invention, the bilinear interpolation calculation formula is as follows:

$$T=[Y2*(T1*X2+T2*X1)+Y1*(T3*X2+T4*X1)]/[(X1+X2)*(Y1+Y2)];$$

wherein T is the temperature of the to-be-tested sub-pixel a, T1 is the temperature at the location of the first temperature sensor A, T2 is the temperature at the location of the second temperature sensor B, and T3 is the temperature at the location of the third temperature sense C, T4 is the temperature at the location of the fourth temperature sensor D; X1 is a horizontal distance between center of the to-be-tested sub-pixel a and center of the first temperature sensor A and the third temperature sensor C, X2 is a horizontal distance between center of the to-be-tested sub-pixel a and center of the second temperature sensor B and the fourth temperature sensor D, Y1 is a vertical distance between center of the to-be-tested sub-pixel a and center of the first temperature sensor A and the second temperature sensor B, and Y2 is a vertical distance between center of the to-be-tested sub-pixel a and center of the third temperature sensor C and the fourth temperature sensor D.

Specifically, the number of the temperature sensors 111 in the temperature sensor layer 11 can be specifically designed according to the size of the OLED panel 1. For example, the OLED panel 1 with a resolution of 3840*2160 can set 30*18 temperature sensors 111 correspondingly.

Specifically, the distance between adjacent temperature sensors 111 is 3 cm-5 cm. Preferably, the distance between adjacent temperature sensors 111 is 4 cm.

Specifically, the specific manner for the processing module 2 to generate a compensation data signal corresponding to the plurality of sub-pixels according to the to-be-displayed brightness of the plurality of sub-pixels and the temperatures of the plurality of sub-pixels is: according to the to-be-displayed brightness of the plurality of sub-pixels, the temperatures of the plurality of sub-pixels, and the default reference data table of relation among the voltage difference between the compensation data voltages corresponding respectively to the plurality of sub-pixels and the threshold voltage of the of driving thin film transistor (TFT), temperature and display brightness, the processing module 2 obtains the voltage difference between the compensation data voltages of corresponding plurality of sub-pixels and the threshold voltage of the driving TFT, and calculate a sum of the voltage difference between the compensation data voltages and threshold voltage and the default threshold voltages of the driving TFT of the plurality of sub-pixels respectively to obtain the compensation data voltages of the plurality of sub-pixels; according to the compensation data voltages of the plurality of sub-pixels, the processing module generates the corresponding compensation data signals of the plurality of sub-pixels.

Moreover, to reduce the size of the memory occupied by the reference data table corresponding to the plurality of sub-pixels respectively so as to reduce the product cost, in the present invention, the reference data table corresponding to each sub-pixel comprises a plurality of sequentially increasing voltage difference node values between the compensation data voltages and the driving TFT threshold voltage, a plurality of sequentially increasing temperature node values, and a plurality of display brightness node values. One display brightness node value corresponds to a combination of one voltage difference node value between the compensation data voltage and the driving TFT threshold voltage and one temperature node value. For example, in a preferred embodiment of the present invention, each reference data table corresponding to each sub-pixel comprises 9 voltage difference node values between the compensation data voltages and the driving TFT threshold voltage, 16 temperature node values, and 144 display brightness node values. The smallest node values of the 9 voltage difference node values between the compensation data voltages and the driving TFT threshold voltage is 0V, the largest node value is 8V, and the difference between two adjacent voltage difference node values between the compensation data voltages and the driving TFT threshold voltage is 1V. The smallest node value of the 16 temperature node values is −20° C., the largest node value is 60° C., and the difference between two adjacent temperature node values is 5° C. When the temperature of the sub-pixel and a corresponding temperature node value in the reference data table are equal, the to-be-displayed brightness of the sub-pixel is equal to a display brightness node value in the corresponding reference data table; and when a combination of the temperature of the sub-pixel and a voltage difference node value between the compensation data voltage and the driving TFT threshold voltage in the corresponding reference data voltage corresponds to the to-be-displayed brightness of the sub-pixel, the voltage difference node value between the compensation data voltage of the to-be-displayed brightness of the sub-pixel and the driving TFT threshold voltage corresponding to the combination with the temperature of the sub-pixel is used as the voltage difference between the compensation data voltage of the sub-pixel and the driving TFT threshold voltage; otherwise, the processing modules uses the reference data table, the to-be-displayed brightness of the sub-pixel, the temperature of the sub-pixel to obtain the voltage difference between the compensation data voltage of the sub-pixel and the driving TFT threshold voltage by interpolation.

For example, when the temperature of the sub-pixel is −15° C., the to-be-displayed brightness of the sub-pixel is the display brightness node value corresponding to a combination of voltage difference node value between the compensation data voltage of the sub-pixel and the driving TFT threshold voltage equal to 1V and the temperature node value equal to −15° C. At this point, 1V is used as the voltage difference between the compensation data voltage of the sub-pixel and the driving TFT threshold voltage. When the temperature of the sub-pixel is −15° C., the display brightness node value corresponding to the combination of any voltage difference node value between the compensation data voltage of the sub-pixel and the driving TFT threshold voltage and the temperature node value of −15° C. is not the same as the to-be-displayed brightness of the sub-pixel. At this time, the 9 display brightness node value corresponding to the combination of the 9 voltage difference node value between the compensation data voltage of the sub-pixel and the driving TFT threshold voltage paired with the temperature node values of −15° C. respectively are used to calculate the to-be-displayed brightness of the sub-pixel by interpolation to obtain the voltage difference between the compensation data voltage of the sub-pixel and the driving TFT threshold voltage corresponding to the to-be-displayed brightness of the sub-pixel when the temperature of the sub-pixel is −15° C. When the temperature of the sub-element is −11° C., the 9 display brightness node values corresponding to the combination of the 9 voltage difference node values between the compensation data voltage of the sub-pixel and the driving TFT threshold voltage paired with the temperature node value of −10° C. and the 9 display brightness node values corresponding to the combination of the 9 voltage difference node values between the compensation data voltage of the sub-pixel and the driving TFT threshold voltage paired with the temperature node value of −15° C. are first used to calculate the temperature of the sub-pixel by interpolation to obtain 9 middle values of the to-to-displayed brightness corresponding to the combination of the 9 voltage difference node values between the compensation data voltage of the sub-pixel and the driving TFT threshold voltage paired with the temperature of the sub-pixel; then, the 9 middle values of the to-to-displayed brightness corresponding to the combination of the 9 voltage difference node values between the compensation data voltage of the sub-pixel and the driving TFT threshold voltage paired with the temperature of the sub-pixel are used to calculate the to-be-displayed brightness of the sub-pixel by interpolation again to obtain the voltage difference between the compensation data voltage of the sub-pixel and the driving TFT threshold voltage corresponding to the to-be-displayed brightness of the sub-pixel when the temperature of the sub-pixel is −11° C.

Figure 3:
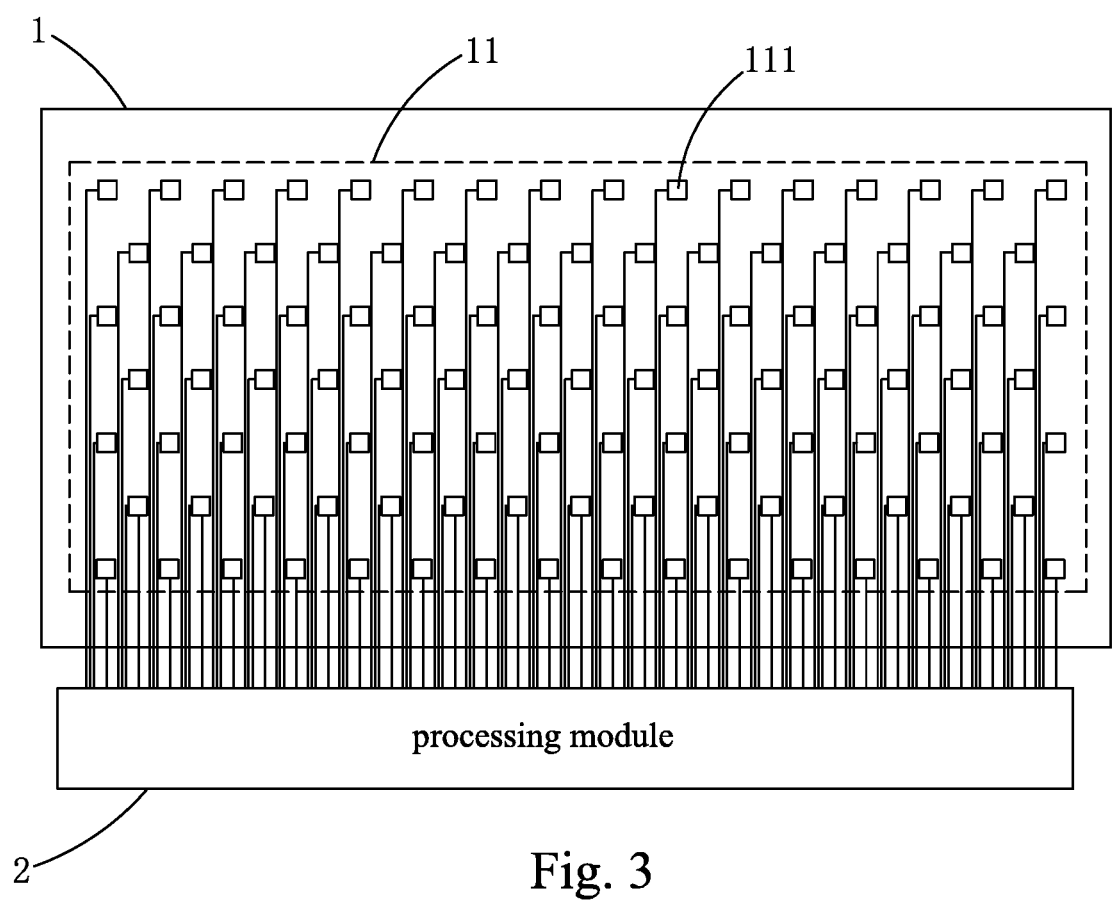
FIG. 3 is a schematic view showing the structure of the OLED panel temperature compensation system of the second embodiment of the present invention.

Refer to FIG. 3. The OLED panel temperature compensation system of the second embodiment of the present invention differs from the first embodiment in that the temperature sensor layer 11 comprises a plurality of rows of temperature sensors 111, and any adjacent four temperature sensors 111 form a virtual parallelogram.

Figure 4:
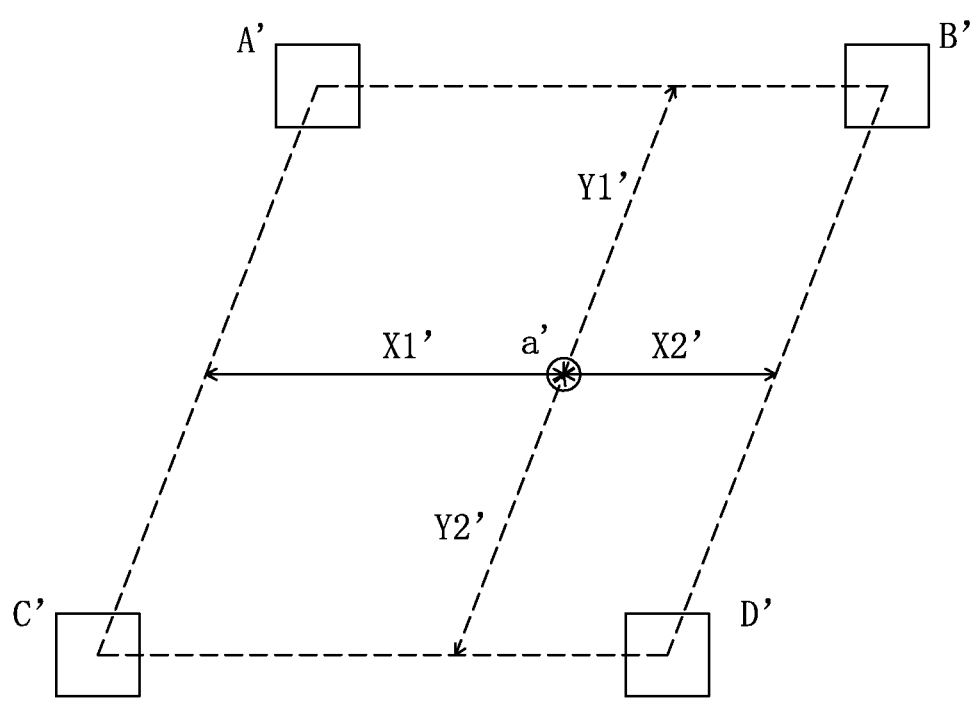
FIG. 4 is a schematic view showing obtaining the temperature of the to-be-tested sub-pixel of the OLED panel temperature compensation system of the second embodiment of the present invention.

Moreover, refer to FIG. 4. The four temperature sensors adjacent to the to-be-tested sub-pixel a' are defined as a first temperature sensor A', a second temperature sensor B', a third temperature sensor C', and a fourth temperature sensor D', respectively; a line connecting center of the first temperature sensor A' and center of the second temperature sensor B' is parallel to a line connecting center of the third temperature sensor C' and center of the fourth temperature sensor D'; a line connecting the center of the first temperature sensor A' and the center of the third temperature sensor C' is parallel to a line connecting the center of the second temperature sensor B' and the center of the fourth temperature sensor D'. Because the center of each of the first temperature sensor A', the second temperature sensor B', the third temperature sensor C', and the fourth temperature sensor D' and the coordinates of the center of the to-be-tested sub-pixel a' on the OLED panel 1 are all known values, the distance X1' between the line connecting the center of the first temperature sensor A' and the center of the third temperature sensor C' and center of the to-be-tested sub-pixel a' in a direction parallel to the line connecting the center of the first temperature sensor A' and the center of the second temperature center B', the distance X2' between the line connecting the center of the second temperature sensor B' and the center of the fourth temperature sensor D' and the center of the to-be-tested sub-pixel a' in a direction parallel to the line connecting the center of the first temperature sensor A' and the center of the second temperature center B', the distance Y1' between the line connecting the center of the first temperature sensor A' and the center of the second temperature sensor B' and center of the to-be-tested sub-pixel a' in a direction parallel to the line connecting the center of the first temperature sensor A' and the center of the third temperature center C', and the distance Y2' between the line connecting the center of the third temperature sensor C' and the center of the fourth temperature sensor D' and center of the to-be-tested sub-pixel a' in a direction parallel to the line connecting the center of the first temperature sensor A' and the center of the third temperature center C' are all known values. The processing module 2 obtains the temperatures of the first temperature sensor A', the second temperature sensor B', the third temperature sensor C', and the fourth temperature sensor D', and calculates the temperature of the to-be-tested sub-pixel a' according to a bilinear interpolation calculation formula.

In the second embodiment of the present invention, the bilinear interpolation calculation formula is as follows:

$$T'=[Y2'^{*}(T1'^{*}X2'+T2'^{*}X1')+Y1'^{*}(T3'^{*}X2'+T4'^{*}X1')]/[(X1'+X2')^{*}(Y1'+Y2')];$$

wherein T' is the temperature of the to-be-tested sub-pixel a', T1' is the temperature at the location of the first temperature sensor A', T2' is the temperature at the location of the second temperature sensor B', and T3' is the temperature at the location of the third temperature sense C', T4' is the temperature at the location of the fourth temperature sensor D'; X1' is a distance between the line connecting the center of the first temperature sensor A' and the center of the third temperature sensor C' and center of the to-be-tested sub-pixel a' in a direction parallel to the line connecting the center of the first temperature sensor A' and the center of the second temperature center B', X2' is a distance between the line connecting the center of the second temperature sensor B' and the center of the fourth temperature sensor D' and the center of the to-be-tested sub-pixel a' in a direction parallel to the line connecting the center of the first temperature sensor A' and the center of the second temperature center B', Y1' is a distance between the line connecting the center of the first temperature sensor A' and the center of the second temperature sensor B' and center of the to-be-tested sub-pixel a' in a direction parallel to the line connecting the center of the first temperature sensor A' and the center of the third temperature center C', and Y2' is a distance between the line connecting the center of the third temperature sensor C' and the center of the fourth temperature sensor D' and center of the to-be-tested sub-pixel a' in a direction parallel to the line connecting the center of the first temperature sensor A' and the center of the third temperature center C'.

It should be noted that the OLED panel temperature compensation system of the present invention disposes a temperature sensor layer 11 of a plurality of temperature sensors 111 on one side or inside of the OLED panel 1. When temperature compensation is performed on the OLED panel 1, the temperature sensor 111 detects the temperature of the location and transmits to the processing module 2, and the processing module 2 receives and processes the initial data signals of the plurality of sub-pixels to obtain the to-be-displayed brightness of the plurality of sub-pixels, and receives and processes the temperatures from the plurality of temperature sensors 111 to obtain the temperatures of the plurality of sub-pixels, and generates and outputs compensation data signals corresponding to the plurality of sub-pixels according to the to-be-displayed brightness of the plurality of sub-pixels and the temperature of the plurality of sub-pixels. Compared to the full range temperature detection and compensation in the prior art, the invention can improve the accuracy of temperature compensation and enhance the display effect of the OLED panel 1.

Figure 5:
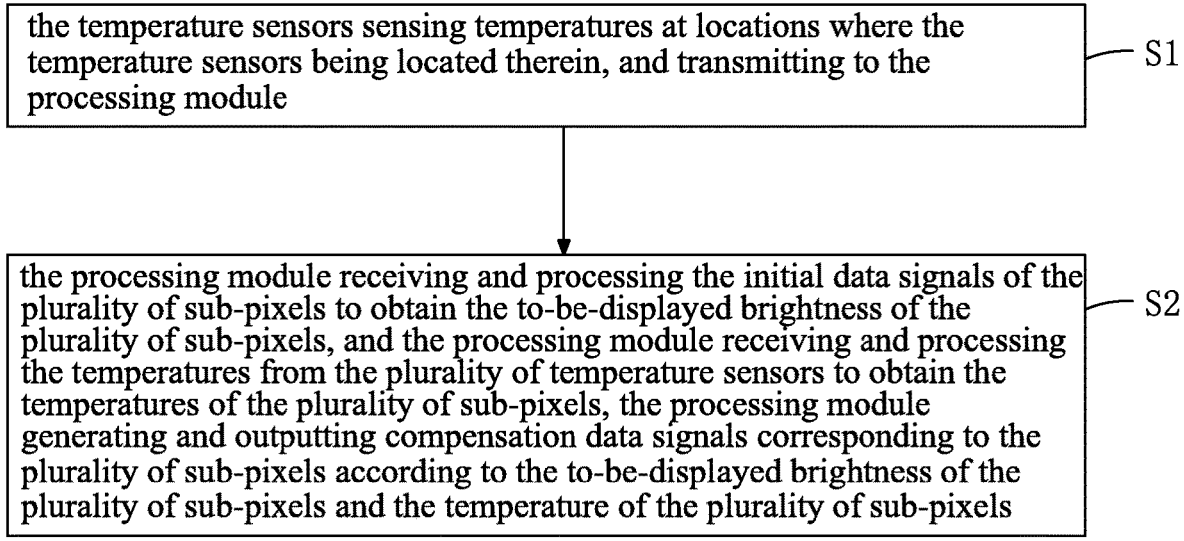
FIG. 5 is a schematic view showing the flowchart of the OLED panel temperature compensation method of the present invention.

Based on the same concept, referring to FIG. 5, the present invention also provides an OLED panel temperature compensation method, applicable to the above OLED panel temperature compensation system. The detailed description of the OLED panel temperature compensation system will not be repeated here. The OLED panel temperature compensation method comprises the steps of:

Step S1: the temperature sensors 111 sensing temperatures at locations where the temperature sensors 111 being located therein, and transmitting to the processing module 2;

Step S2: the processing module 2 receiving and processing the initial data signals of the plurality of sub-pixels to obtain the to-be-displayed brightness of the plurality of sub-pixels, and the processing module 2 receiving and processing the temperatures from the plurality of temperature sensors to obtain the temperatures of the plurality of sub-pixels, the processing module 2 generating and outputting compensation data signals corresponding to the plurality of sub-pixels according to the to-be-displayed brightness of the plurality of sub-pixels and the temperature of the plurality of sub-pixels.

It should be noted that the OLED panel temperature compensation method of the present invention disposes a temperature sensor layer 11 of a plurality of temperature sensors 111 on one side or inside of the OLED panel 1. When temperature compensation is performed on the OLED panel 1, the temperature sensor 111 detects the temperature of the location and transmits to the processing module 2, and the processing module 2 receives and processes the initial data signals of the plurality of sub-pixels to obtain the to-be-displayed brightness of the plurality of sub-pixels, and receives and processes the temperatures from the plurality of temperature sensors 111 to obtain the temperatures of the plurality of sub-pixels, and generates and outputs compensation data signals corresponding to the plurality of sub-pixels according to the to-be-displayed brightness of the plurality of sub-pixels and the temperature of the plurality of sub-pixels. Compared to the full range temperature detection and compensation in the prior art, the invention can improve the accuracy of temperature compensation and enhance the display effect of the OLED panel 1.

In summary, the OLED panel temperature compensation system comprises an OLED panel and a processing module electrically connected to the OLED panel, the OLED panel comprises a plurality of sub-pixels arranged in an array, and is disposed with a temperature sensor layer of a plurality of temperature sensors on one side or inside; when temperature compensation is performed on the OLED panel, the temperature sensor detects the temperature of the location and transmits to the processing module, and the processing module receives and processes the initial data signals of the plurality of sub-pixels to obtain the to-be-displayed brightness of the plurality of sub-pixels, and receives and processes the temperatures from the plurality of temperature sensors to obtain the temperatures of the plurality of sub-pixels, and generates and outputs compensation data signals corresponding to the plurality of sub-pixels according to the to-be-displayed brightness of the plurality of sub-pixels and the temperature of the plurality of sub-pixels. As such, the OLED panel can be accurately and effectively compensated for temperature. The invention provides an OLED panel temperature compensation method, which can accurately and effectively compensate the temperature of the OLED panel.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claim of the present invention.

What is claimed is:

1. An organic light-emitting diode (OLED) panel temperature compensation system, comprising: an OLED panel and a processing module electrically connected to the OLED panel;

the OLED panel comprising a plurality of sub-pixels arranged in an array, one side of the OLED panel being disposed with a temperature sensor layer; or inside of the OLED panel being disposed with a temperature sensor layer parallel to the side of the OLED panel;

the temperature sensor layer comprising a plurality of temperature sensors disposed at intervals; each temperature sensor being electrically connected to the processing module;

the plurality of temperature sensors being configured to detect a temperature of a location located therein and transmitting the temperature to the processing module;

the processing module being configured to receive an initial data signal of a plurality of sub-pixels and process to obtain a to-be-displayed brightness of the plurality of sub-pixels; the processing module receiving the temperatures from the plurality of temperature sensors and processes the temperatures to obtain the temperatures of the plurality of sub-pixels, and the processing module generating and outputting the compensation data signals corresponding to the plurality of sub-pixels according to the to-be-displayed brightness of the plurality of sub-pixels and the temperatures of the plurality of sub-pixels;

wherein the specific manner for the processing module to receive the temperatures at the location of the plurality of temperature sensors and processes to obtain the temperatures at the location where the plurality of sub-pixels are located is: setting one of the plurality of sub-pixels as a to-be-tested sub-pixel; the processing module receiving the temperatures at the locations of four temperature sensors adjacent to the to-be-tested sub-pixel, and calculating the temperature of the to-be-tested sub-pixel by bilinear interpolation;

wherein the temperature sensor layer comprises a plurality of temperature sensors arranged in an array;

wherein among the four temperature sensors in the 2×2 array adjacent to the to-be-tested sub-pixel, one of the four temperature sensors at the first row first column, one of the four temperature sensors at the first row second column, one of the four temperature sensors at the second row first column, and one of the four temperature sensors at the second row second column are defined as a first temperature sensor, a second temperature sensor, a third temperature sensor, and a fourth temperature sensor, respectively; the processing module obtains the temperatures of the first temperature sensor, the second temperature sensor, the third temperature sensor, and the fourth temperature sensor, and calculates the temperature of the to-be-tested sub-pixel according to a bilinear interpolation calculation formula;

the bilinear interpolation calculation formula is as follows:

$$T=[Y2*(T1*X2+T2*X1)+Y1*(T3*X2+T4*X1)]/[(X1+X2)*(Y1+Y2)];$$

wherein T is the temperature of the to-be-tested sub-pixel, T1 is the temperature at the location of the first temperature sensor, T2 is the temperature at the location of the second temperature sensor, and T3 is the temperature at the location of the third temperature sense, T4 is the temperature at the location of the fourth temperature sensor; X1 is a horizontal distance between center of the to-be-tested sub-pixel and center of the first temperature sensor and the third temperature sensor, X2 is a horizontal distance between center of the to-be-tested sub-pixel and center of the second temperature sensor and the fourth temperature sensor, Y1 is a vertical distance between center of the to-be-tested sub-pixel and center of the first temperature sensor and the second temperature sensor, and Y2 is a vertical distance between center of the to-be-tested sub-pixel and center of the third temperature sensor and the fourth temperature sensor.

2. The OLED panel temperature compensation system as claimed in claim 1, wherein the temperature sensor layer comprises a plurality of rows of temperature sensors, and any adjacent four temperature sensors form a virtual parallelogram.

3. The OLED panel temperature compensation system as claimed in claim 1, wherein the distance between adjacent temperature sensors is 3 cm-5 cm.

4. The OLED panel temperature compensation system as claimed in claim 1, wherein the specific manner for the processing module to generate a compensation data signal corresponding to the plurality of sub-pixels according to the to-be-displayed brightness of the plurality of sub-pixels and the temperatures of the plurality of sub-pixels is: according to the to-be-displayed brightness of the plurality of sub-pixels, the temperatures of the plurality of sub-pixels, and a default reference data table of relation among voltage difference between compensation data voltages corresponding respectively to the plurality of sub-pixels and threshold voltage of a driving thin film transistor (TFT), temperature and display brightness, the processing module obtains the voltage difference between the compensation data voltages of corresponding plurality of sub-pixels and the threshold voltage of the driving TFT, and calculate a sum of the voltage difference between the compensation data voltages and threshold voltage and the default threshold voltages of the driving TFT of the plurality of sub-pixels respectively to obtain the compensation data voltages of the plurality of sub-pixels; according to the compensation data voltages of the plurality of sub-pixels, the processing module generates the corresponding compensation data signals of the plurality of sub-pixels.

5. The OLED panel temperature compensation system as claimed in claim 4, wherein the reference data table corresponding to each sub-pixel comprises a plurality of sequentially increasing voltage difference node values between the compensation data voltages and the driving TFT threshold voltage, a plurality of sequentially increasing temperature node values, and a plurality of display brightness node values; one display brightness node value corresponds to a combination of one voltage difference node value between the compensation data voltage and the driving TFT threshold voltage and one temperature node value; when the temperature of the sub-pixel and a corresponding temperature node value in the reference data table are equal, the to-be-displayed brightness of the sub-pixel is equal to a display brightness node value in the corresponding reference data table; and when a combination of the temperature of the sub-pixel and a voltage difference node value between the compensation data voltage and the driving TFT threshold voltage in the corresponding reference data voltage corresponds to the to-be-displayed brightness of the sub-pixel, the voltage difference node value between the compensation data voltage of the to-be-displayed brightness of the sub-pixel and the driving TFT threshold voltage corresponding to the combination with the temperature of the sub-pixel is used as the voltage difference between the compensation data voltage of the sub-pixel and the driving TFT threshold voltage; otherwise, the processing modules uses the reference data table, the to-be-displayed brightness of the sub-pixel, the temperature of the sub-pixel to obtain the voltage difference between the compensation data voltage of the sub-pixel and the driving TFT threshold voltage by interpolation.

* * * * *